US008817364B2

(12) United States Patent
Kim et al.

(10) Patent No.: US 8,817,364 B2
(45) Date of Patent: Aug. 26, 2014

(54) DEVICE WHICH PRODUCES VARIOUS TYPES OF PULSES BY CONTROLLING THE DISTANCE BETWEEN THE SATURABLE ABSORBER CONNECTORS

(71) Applicant: Korea Advanced Institute of Science and Technology, Daejeon (KR)

(72) Inventors: Soo Hyun Kim, Daejeon (KR); Kyung-Soo Kim, Seoul (KR); Sung Yoon Ryu, Daejeon (KR); Won Sik Kwon, Jeonju-si (KR); Hyub Lee, Seoul (KR); Jin Hwan Kim, Siheung-si (KR); Jin Doo Choi, Seoul (KR); Seung Hwan Jo, Daejeon (KR); Sang Wook Lee, Daejeon (KR); Seung Ryeol Oh, Daegu (KR)

(73) Assignee: Korea Advanced Institute of Science and Technology, Daejeon-si (KR)

( * ) Notice: Subject to any disclaimer, the term of this patent is extended or adjusted under 35 U.S.C. 154(b) by 35 days.

(21) Appl. No.: 13/739,538

(22) Filed: Jan. 11, 2013

(65) Prior Publication Data
US 2013/0182726 A1 Jul. 18, 2013

(30) Foreign Application Priority Data

Jan. 12, 2012 (KR) ........................ 10-2012-0003688

(51) Int. Cl.
*H01S 3/106* (2006.01)
(52) U.S. Cl.
USPC ............................................ 359/333; 372/11
(58) Field of Classification Search
USPC .................. 359/333; 372/6, 30, 11
See application file for complete search history.

(56) References Cited

U.S. PATENT DOCUMENTS

| | | | |
|---|---|---|---|
| 6,570,892 B1* | 5/2003 | Lin et al. | 372/6 |
| 2011/0158265 A1 | 6/2011 | Chang et al. | |
| 2012/0133931 A1* | 5/2012 | Fermann et al. | 356/300 |
| 2014/0022533 A1* | 1/2014 | Fermann et al. | 356/51 |

FOREIGN PATENT DOCUMENTS

| | | |
|---|---|---|
| JP | 2005-322864 A | 11/2005 |
| KR | 10-1027321 B1 | 3/2011 |
| WO | 00/36718 A1 | 6/2000 |

OTHER PUBLICATIONS

J.-L. Peng, et al., "Highly stable, frequency-controlled mode-locked erbium fiber laser comb", Appl. Phys. B, 2007, vol. 86, pp. 49-53.
J-H Lin & K-H Lin, "Multiple pulsing and harmonic mode-locking in an all-normal-dispersion Nd:GdVO$_4$ laser using a nonlinear mirror", J. Phys. B: At. Mol. Opt. Phys., 2010, vol. 43, pp. 1-6.
Korean Patent Office, Notice of Allowance issued in corresponding KR Application No. 10-2012-0003688, dated May 24, 2013.

* cited by examiner

*Primary Examiner* — Mark Hellner
(74) *Attorney, Agent, or Firm* — Sughrue Mion, PLLC

(57) ABSTRACT

Provided is a device of generating various types of pulses by controlling a distance between saturable absorber connectors, and more particularly, a device of generating various types of pulses by controlling a distance between saturable absorber connectors, capable of actively controlling a distance between saturable absorbers to completely overcome a disadvantage that an opened space is present in a cavity or a disadvantage that a fiber component should be changed and implementing a simple design of the entire fiber laser cavity since only a saturable absorber part, which is a portion of a fiber laser cavity, should be designed, as a carbon nanotube saturable absorber part in a passively mode-locked fiber laser generating apparatus using the saturable absorber.

4 Claims, 5 Drawing Sheets

(a)

(b)

(c)

(a)

(b)

(c)

(a)

(b)

(c)

(a)

(b)

(c)

DEVICE WHICH PRODUCES VARIOUS TYPES OF PULSES BY CONTROLLING THE DISTANCE BETWEEN THE SATURABLE ABSORBER CONNECTORS

This application claims priority under 35 U.S.C. §119 to Korean Patent Application No. 10-2012-0003688, filed on Jan. 12, 2012, in the Korean Intellectual Property Office, the disclosure of which is incorporated herein by reference in its entirety.

TECHNICAL FIELD

The following disclosure relates to a device of generating various types of pulses by controlling a distance between saturable absorber connectors, and more particularly, to a device of generating various types of pulses by controlling a distance between saturable absorber connectors, capable of actively controlling a distance between saturable absorbers to completely overcome a disadvantage that an opened space is present in a cavity or a disadvantage that a fiber component should be changed and implementing a simple design of the entire fiber laser cavity since only a saturable absorber part, which is a portion of a fiber laser cavity, should be designed, as a carbon nanotube saturable absorber part in a passively mode-locked fiber laser generating apparatus using the saturable absorber.

BACKGROUND

Recently, successful studies of a fiber laser generating a short pulse through passively mode-locking using a carbon nanotube saturable absorber have been reported in various papers and Patent Documents. However, according to the related art up to now, a technology of actively, easily, and variously changing properties of the pulse with respect to the fiber laser has not existed, such that many efforts to change the pulse have been required.

As an example of the related art, "Passively Mode-locked Fiber Laser Using Carbon Nanotubes" has been disclosed in US Patent Laid-Open Publication No. 2010-0296527A1. In this case, a repetition rate of a pulse may be changed by controlling a cavity length. However, since the entire cavity is made of fibers, it may be impossible to actively control the length. Therefore, the cavity length is passively controlled by replacing some of the optical components such as the fiber, or the like, such that the repetition rate may be changed from 316 to 415 MHz.

A system of stabilizing a repetition rate of the pulse laser using a principle similar to that in the above mentioned Patent Document has been reported in a paper entitled "Highly Stable, Frequency-Controlled Mode-Locked Erbium Fiber Laser Comb" (J. L. Peng, H. Ahn, R. H. Shu, H. C. Chui and J. W. Nicholson, Applied Physics B: Lasers and Optics, 86, 49-53, 2007). A repetition rate may be controlled by actively and finely controlling a cavity length using a piezoelectric device (PZT) mounted at an end portion of a fiber. However, in the system as described above, since the entire cavity is not made of only the fibers but includes optical components such as a condensing lens, or the like, a section at which the pulse is outside of the fiber to propagate in the air is generated, which causes the system to be unstable.

In addition, the method of generating a second harmonic wave using a KTP crystal device having secondary non-linearity for multiple pulsing has been disclosed in a paper entitled "Multiple Pulsing and Harmonic Mode-Locking in an All-Normal-Dispersion Nd:GdVO$_4$ Laser Using a Nonlinear Mirror" (J. H. Lin and K. H. Lin, J. Phys. B: At. Mol. Opt. Phys. Vol. 43, 065402, 2010). The generated second harmonic wave causes group velocity mismatch with an original fundamental wave, but third, fourth, fifth harmonic waves are generated by actively controlling a distance between the KTP crystal and an output coupler. However, in this method, since a secondary non-linear device such as the KTP crystal is required and a position thereof should be controlled, it may be impossible to use this method in a system entirely based on the fiber.

RELATED ART DOCUMENT

Patent Document (Patent Document 1) US 2010/0296527 A1

Non-Patent Document (Non-Patent Document 2) Multiple Pulsing and Harmonic Mode-Locking in an All-Normal-Dispersion Nd:GdVO$_4$ Laser Using a Nonlinear Mirror (J. H. Lin and K. H. Lin, J. Phys. B: At. Mol. Opt. Phys. 43 065402, 2010)

SUMMARY

An embodiment of the present invention is directed to providing a device of generating various types of pulses by controlling a distance between saturable absorber connectors, capable of actively controlling a micro distance between connectors of a carbon nanotube saturable absorber to generate pulses having various repetition rates and offset frequencies without directly replacing optical components while maintaining a base of a ring cavity entirely formed of fibers without having a section at which pulse is transferred in the air, instead of a general method of forming a section at which the pulse is transferred in the air and then controlling a cavity length to thereby control the repetition rate and the offset frequency.

In one general aspect, there is provided a device of generating various type of pulses by controlling a distance between saturable absorber connectors, the device including: a saturable absorber moving unit 500 including a saturable absorber mounting part 100 having one portion to which a saturable absorber 110 is coupled and the other portion to which a fiber 120 is coupled, a fiber fixing part 200 having one portion to which the saturable absorber mounting part 100 is coupled, and a micro driving part 300 coupled to the other portion of the fiber fixing part 200 to horizontally move the fiber fixing part 200; a saturable absorber fixing unit 600 including a saturable absorber mounting part 100 having one portion to which a saturable absorber 110 is coupled and the other portion to which a fiber 120 is coupled and a fiber fixing part 200 having one portion to which the saturable absorber mounting part 100 is coupled, and fixed to be spaced apart from the saturable absorber moving unit 500 by a predetermined distance; and a fiber connecting unit 700 provided between the saturable absorber moving unit 500 and the saturable absorber fixing unit 600 to be fixed.

The fiber fixing part 200 of the saturable absorber moving unit 500 may include a fixing part lower plate 210 having one portion coupled to the micro driving part 300 to be horizontally moved; and a vertical fixing part 220 having one portion coupled to the fixing part lower plate 210 and the other portion to which the saturable absorber mounting part 100 is fixed.

The fiber fixing part 200 of the saturable absorber moving unit 500 may be coupled to the micro driving part 300 through a driving shaft 310, and the fiber fixing part 200 may be horizontally moved at the time of rotation of the driving shaft 310.

The micro driving part 300 may be a piezo motor.

BRIEF DESCRIPTION OF THE DRAWINGS

FIGS. 5A to 6C are graphs showing a spectrum for each wavelength, time characteristics of an output signal, and a radio frequency (RF) spectrum in the case in which the distance between saturable absorbers is shorter than a mode-locking distance.

[Detailed Description of Main Elements]

| | |
|---|---|
| 1000: Device of generating various types of pulses by controlling distance between saturable absorber connectors (according to the present invention) | |
| 100: Saturable absorber mounting part | |
| 110: Saturable absorber | 120: fiber |
| 200: Fiber fixing part | |
| 210: Fixing part lower plate | 220: vertical fixing part |
| 300: Micro driving part | |
| 310: Driving shaft | |
| 500: Saturable absorber moving unit | |
| 600: Saturable absorber fixing unit | |
| 700: Fiber connecting part | |
| 10: Input pump laser | |
| 20: Wavelength Division Multiplexer (WDM) | |
| 30: Er-doped fiber | |
| 40: Output coupler | |
| 50: Polarization controller | |
| 60: Isolator | |

DETAILED DESCRIPTION OF EMBODIMENTS

Hereinafter, a device generating various types of pulses by controlling a distance between saturable absorber connectors as described above will be describe in detail with reference to the accompanying drawings.

Figure 1:
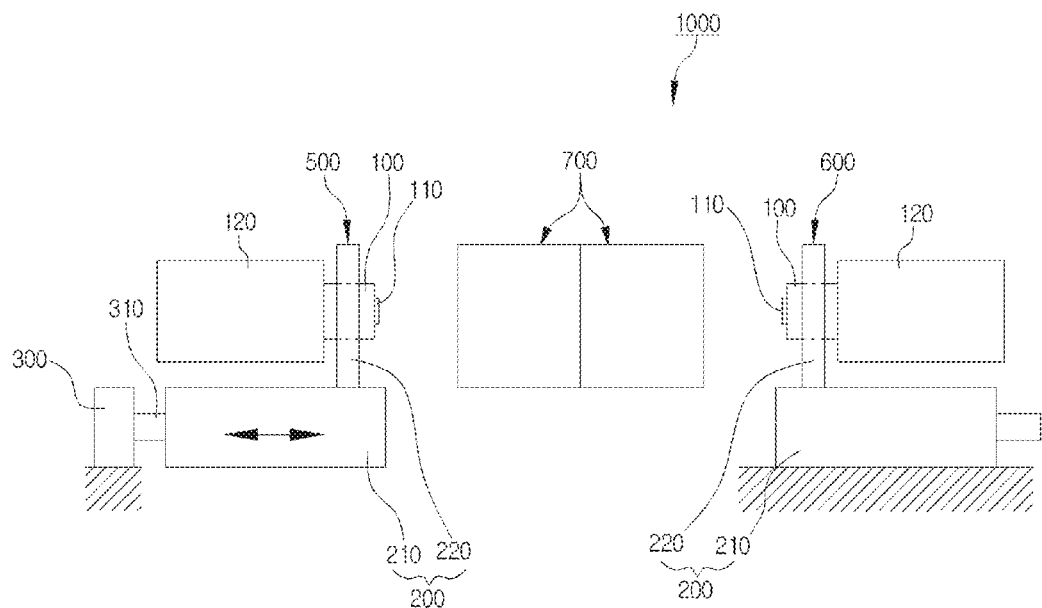
FIG. 1 is a schematic diagram showing a device of generating various types of pulses by controlling a distance between saturable absorber connectors according to an exemplary embodiment of the present invention.

FIG. 1 is a schematic diagram showing a device generating various types of pulses by controlling a distance between saturable absorber connectors.

As shown in FIG. 1, the device generating various types of pulses by controlling a distance between saturable absorber connectors according to the present invention may be configured of a saturable absorber moving unit 500 including a saturable absorber mounting part 100 having one portion to which a saturable absorber 110 is coupled and the other portion to which a fiber 120 is coupled, a fiber fixing part 200 having one portion to which the saturable absorber mounting part 100 is coupled, and a micro driving part 300 coupled to the other portion of the fiber fixing part 200 to horizontally move the fiber fixing part 200; a saturable absorber fixing unit 600 including a saturable absorber mounting part 100 having one portion to which a saturable absorber 110 is coupled and the other portion to which a fiber 120 is coupled and a fiber fixing part 200 having one portion to which the saturable absorber mounting part 100 is coupled and fixed to be spaced apart from the saturable absorber moving unit 500 by a predetermined distance; and a fiber connecting unit 700 provided between the saturable absorber moving unit 500 and the saturable absorber fixing unit 600 to be fixed.

Firstly, the device generating various types of pulses by controlling a distance between saturable absorber connectors is mainly configured of the saturable absorber moving unit 500, the saturable absorber fixing unit 600, and the fiber connecting unit 700.

The saturable absorber moving unit 500 is configured so that the saturable absorber 110 may be coupled to one portion thereof to horizontally move.

The saturable absorber 110 is coupled to one portion of the saturable absorber mounting part 100, and the fiber 120 is coupled to the other portion thereof.

In addition, one portion of the saturable absorber mounting part 100 is coupled to the fiber fixing part 200. In this case, the fiber fixing part 200 is configured to include a fixing part lower plate 210 and a vertical fixing part 220 extended upwardly from the fixing part lower plate 210 as shown in FIG. 1, and the saturable absorber mounting part 100 is coupled and fixed to an upper portion of the vertical fixing part 220. In addition, the fixing part lower plate 210 is configured so that the micro driving part 300 may be coupled to one portion thereof to horizontally move the fixing part lower plate 210. In this case, although not shown, one portion of the micro driving part 300 is fixed, and in the case in which the micro driving part 300 is driven, the fixing part lower plate 210 is horizontally moved in a state in which the micro driving part 300 is fixed. Therefore, since the saturable absorber mounting part 100 connected to the fixing part lower plate 210 is simultaneously moved, the saturable absorber 110 coupled to one side of the saturable absorber mounting part 100 may also be horizontally moved.

Further, the saturable absorber fixing unit 600 is fixed so as to be spaced apart from the saturable absorber moving unit 500 by the predetermine distance.

In this case, the saturable absorber fixing unit 600 has the same configurations as those of the saturable absorber moving unit 500 except for the micro driving part 300.

That is, in the saturable absorber fixing unit 600, the saturable absorber mounting part 100 having one portion to which the saturable absorber 110 is coupled and the other portion to which a fiber 120 is coupled and fixed to the fiber fixing part 200, and a fixing part lower plate 210 of the fiber fixing part 200 is fixed to a body, or the like, thereby maintaining a state in which the saturable absorber 110 is fixed.

Here, the fiber connecting unit 700 is provided between the saturable absorber moving unit 500 and the saturable absorber fixing unit 600 and mechanically connecting the saturable absorber moving unit 500 and the saturable absorber fixing unit 600 with each other to configure a cavity.

The device generating various types of pulses by controlling a distance between saturable absorber connectors having the above-mentioned configuration according to the present invention may actively control the distance between the saturable absorbers, thereby making it possible to simply obtain various types of pulse in a passively mode-locked fiber laser apparatus.

In addition, as another exemplary embodiment of the present invention, a fiber fixing part 200 of the saturable absorber moving unit 500 may be configured so that the fiber fixing part 200 is coupled to the micro driving part 300 through a driving shaft 310 to horizontally move the fiber fixing part 200 at the time of rotation of the driving shaft 310.

That is, when the micro driving part 300 operates to rotate the driving shaft 310, a rotation motion of the driving shaft 310 is converted into linear motion, such that the fixing part lower plate 210 may be horizontally moved.

To this end, the driving shaft 310 may be coupled to the fiber fixing part 200 by a ball screw, a screw, or a worm and a worm gear and convert the rotation motion of the micro driving part 300 into the linear motion to thereby transfer the linear motion to the fiber fixing part 200. Therefore, the distance between the saturable absorbers 110 may be more precisely controlled.

In this case, the micro driving part 300 may be configured of a piezo motor. That is, in the case of using the piezo motor, the distance between the saturable absorbers 110 may be more finely controlled.

Hereinafter, a passively mode-locked fiber laser system having a ring shape in which the device generating various types of pulses by controlling a distance between saturable absorber connectors according to the present invention (hereinafter, referred to as a "pulse generating device" is applied to an optical cavity will be described.

Figure 2:
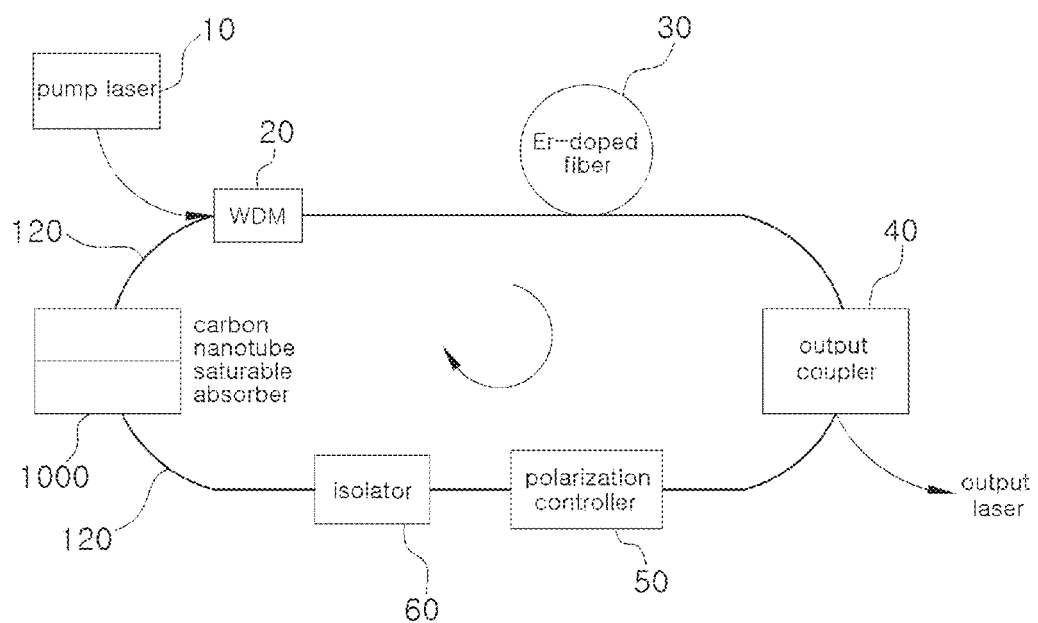
FIG. 2 is a schematic diagram showing a passively mode-locked fiber laser system having a ring shape using the device of generating various types of pulses by controlling a distance between saturable absorber connectors according to the exemplary embodiment of the present invention.

Referring to FIG. 2, first, the optical cavity is configured in a ring shape, and an input pump laser 10 formed at one portion thereof generates light. In addition, the generated light passes through a wavelength division multiplexer (WDM) 20 and Er-doped fiber 30, such that laser is emitted and circulates the ring shaped optical cavity. Further, the laser circulates while passing through a polarization controller 50, an isolator 60, and the pulse generating device 1000 according to the present invention.

In addition, the fibers 120 of the saturable absorber moving unit 500 and the saturable absorber fixing unit 600 of the pulse generating device 1000 according to the present invention are connected to the ring shaped optical cavity, and the pulse generating device 1000 is coupled to the isolator 60 and the wavelength division multiplexer 20.

In this case, mode-locked laser is generated in the pulse generating device 1000, and laser having a predetermined intensity is output to the outside of the optical cavity through the output coupler 40.

In addition, Experimental Examples of the laser generated by the optical cavity mounted with the pulse generating device 1000 according to the present invention and having the above-mentioned configuration will be described below.

Experimental Example 1

Figure 3:
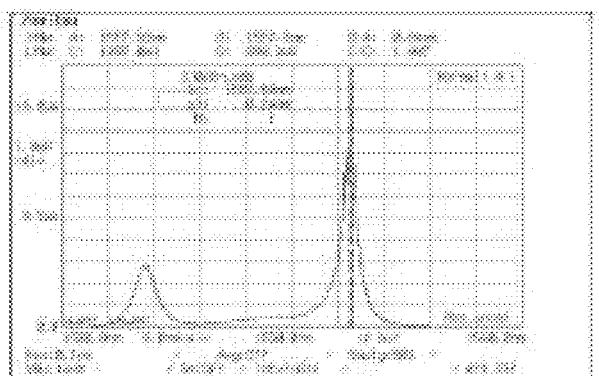
FIGS. 3A to 3C are graphs showing a spectrum for each wavelength, time characteristics of an output signal, and a radio frequency (RF) spectrum in the case in which the distance between saturable absorbers is longer than a mode-locking distance.
Figure 3:
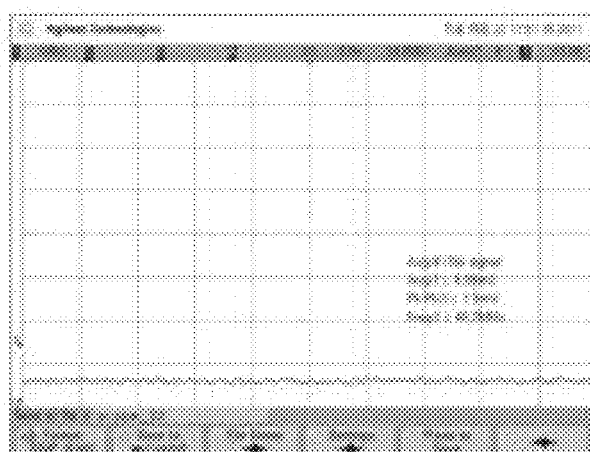
Figure 3:
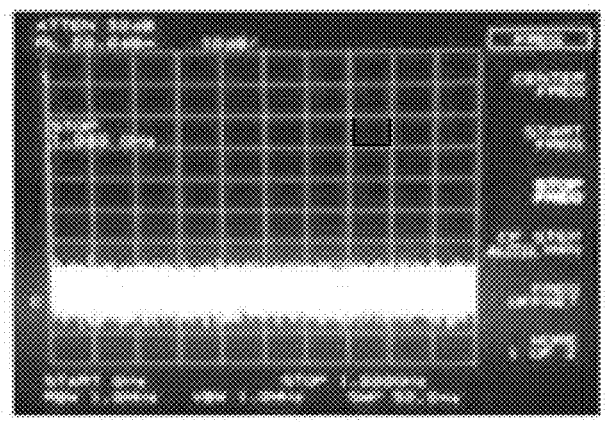

FIGS. 3A to 3C are graphs showing a spectrum for each wavelength, time characteristics of an output signal, and a radio frequency (RF) spectrum in the case in which the distance between saturable absorbers is more than a mode-locking distance.

The case corresponds to the state in which the cavity starts to be closed, and a luminescence spectrum at 1550 nm was measured. Only DC signals may be obtained in an oscilloscope.

Experimental Example 2

Figure 4:
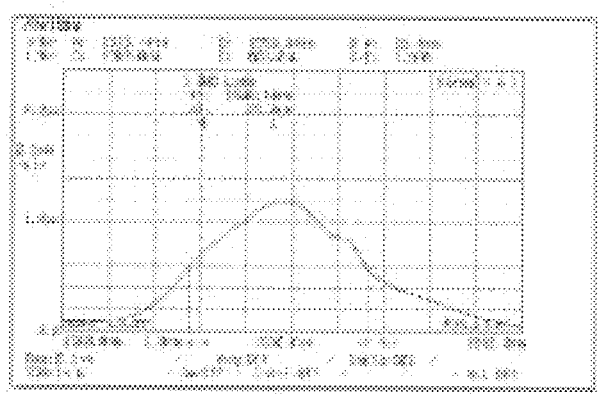
FIGS. 4A to 4C are graphs showing a spectrum for each wavelength, time characteristics of an output signal, and a radio frequency (RF) spectrum in the case in which the distance between the saturable absorbers is the same as the mode-locking distance.
Figure 4:
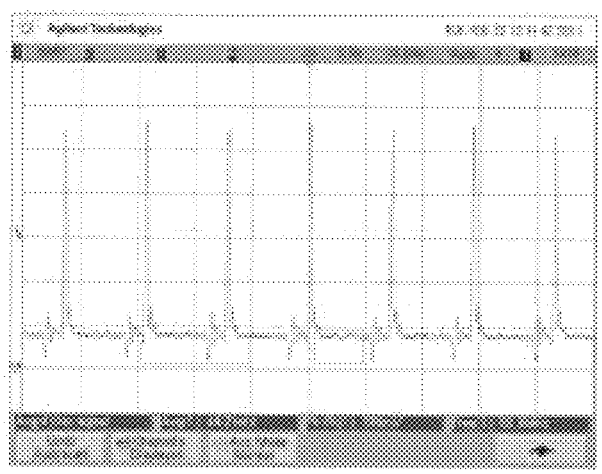
Figure 4:
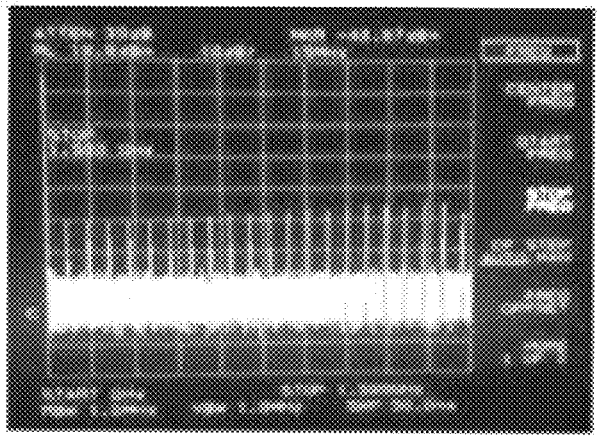
Figure 5:
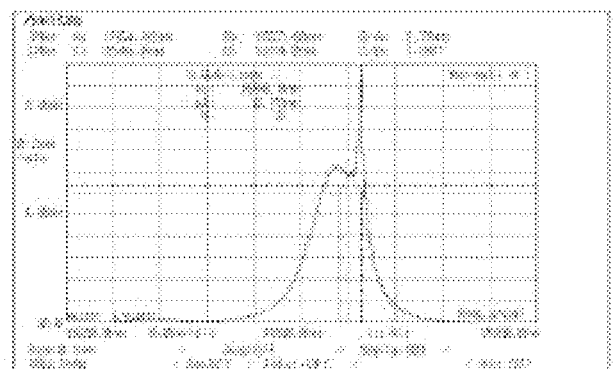
Figure 5:
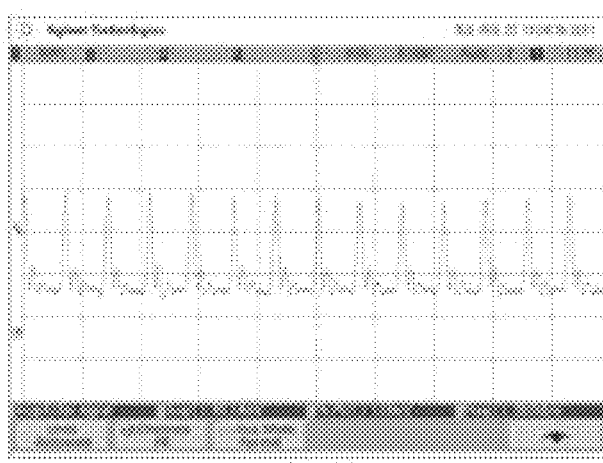
Figure 5:
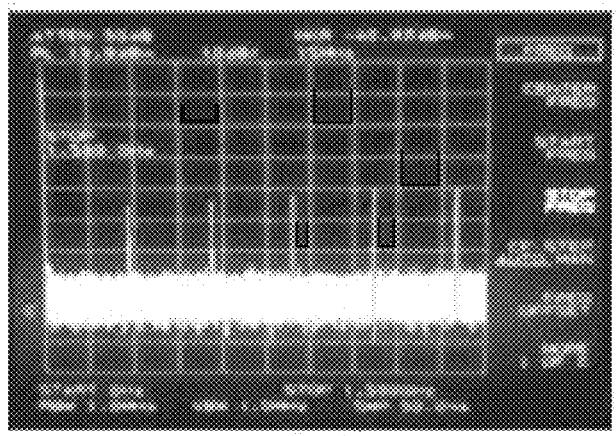
Figure 6:
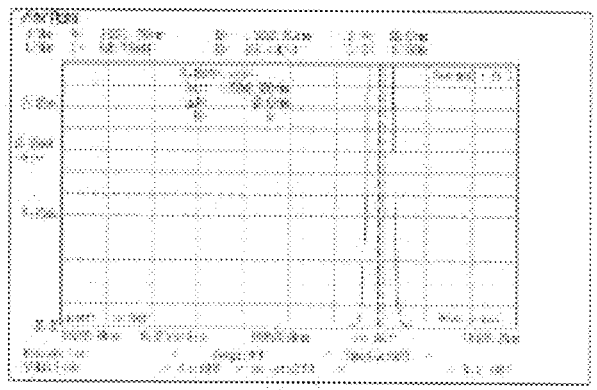
Figure 6:
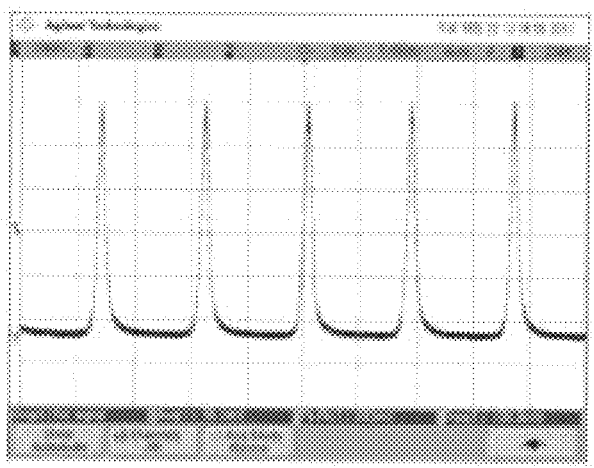
Figure 6:
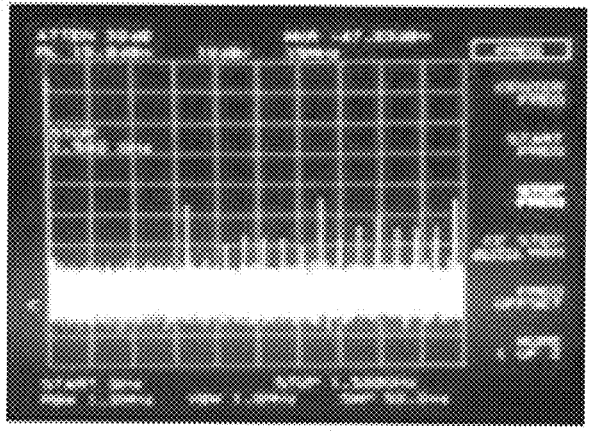

FIGS. 4A to 4C are graphs showing a spectrum for each wavelength, time characteristics of an output signal, and a radio frequency (RF) spectrum in the case in which the distance between the saturable absorbers is the same as the mode-locking distance.

In this case, mode-locking was generated, and a spectrum for each wavelength in a wide wavelength band may be obtained. A pulse oscillated at a frequency of about 70 MHz may be obtained in an oscilloscope, and a longitudinal mode corresponding to integer times of 70 MHz in a range of 0 to 1.5 GHz may be measured in the RF spectrum.

Experimental Example 3

FIGS. 5A to 6C are graphs showing a spectrum for each wavelength, time characteristics of an output signal, and a radio frequency (RF) spectrum in the case in which the distance between saturable absorbers is shorter than a mode-locking distance.

In the case of the graphs of FIGS. 5A to 5C, a harmonic mode-locking (HML) phenomenon was generated, such that the spectrum for each wavelength became narrow. It could be appreciated that a peak appeared near 1558 nm. The reason is that a mode lock signal and a continuous wave (CW) laser signal are simultaneously generated. A pulse oscillated at a frequency of 282 MHz may be obtained in an oscilloscope. In this case, the pulse was oscillated at a frequency about four times higher as compared with the pulse of 70 MHz generated in the normal mode locking.

The graphs of FIGS. 6A to 6C corresponded to a case in which the distance between the saturable absorbers was shorter than that in FIGS. 5A to 5C. In this case, a Q-switching phenomenon (a phenomenon that accumulated energy is rapidly emitted as a rapid and acute light pulse in the case of suddenly increasing a Q value after a laser medium is excited in a state in which the Q value of the laser cavity is decreased to allow sufficient energy to be accumulated therein) was generated. In the case of the spectrum for each wavelength, a central wavelength was increased, and a wavelength width was decreased. A pulse oscillated at a slow frequency of about 109.3 MHz and having a wide pulse width may be obtained in an oscilloscope.

As described above, through Experimental Examples 1 to 3, it was confirmed that the mode-locked pulse laser, the Q-switching pulse, the HML pulse, and the CW laser may be actively generated by controlling the distance between the saturable absorbers.

As set forth above, the device generating various types of pulses by controlling a distance between saturable absorber connectors according to the present invention may actively control the distance between the saturable absorbers, thereby making it possible to simply obtain various types of pulses in a passively mode-locked fiber laser apparatus. According to the present invention, the disadvantage that the opened space is present in the cavity or the disadvantage that the fiber component should be changed may be completely overcome. Further, since only the saturable absorber part, which is the portion of the fiber laser cavity, should be designed, the entire design of the fiber laser cavity is not largely different from the existing cavity, such that the present invention may be realized with a simple design.

The present invention is not limited to the above-mentioned exemplary embodiments but may be variously applied, and may be variously modified by those skilled in the art to which the present invention pertains without departing from the gist of the present invention claimed in the claims.

What is claimed is:

1. A device of generating various types of pulses by controlling a distance between saturable absorber connectors, the device comprising:
    a saturable absorber moving unit 500 including a saturable absorber mounting part 100 having one portion to which a saturable absorber 110 is coupled and the other portion to which a fiber 120 is coupled, a fiber fixing part 200 having one portion to which the saturable absorber mounting part 100 is coupled, and a micro driving part 300 coupled to the other portion of the fiber fixing part 200 to horizontally move the fiber fixing part 200;
    a saturable absorber fixing unit 600 including a saturable absorber mounting part 100 having one portion to which a saturable absorber 110 is coupled and the other portion to which a fiber 120 is coupled and a fiber fixing part 200 having one portion to which the saturable absorber mounting part 100 is coupled, and fixed to be spaced apart from the saturable absorber moving unit 500 by a predetermined distance; and
    a fiber connecting unit 700 provided between the saturable absorber moving unit 500 and the saturable absorber fixing unit 600 to be fixed.

2. The device of claim 1, wherein the fiber fixing part 200 of the saturable absorber moving unit 500 includes a fixing part lower plate 210 having one portion coupled to the micro driving part 300 to be horizontally moved; and a vertical fixing part 220 having one portion coupled to the fixing part lower plate 210 and the other portion to which the saturable absorber mounting part 100 is fixed.

3. The device of claim 1, wherein the fiber fixing part 200 of the saturable absorber moving unit 500 is coupled to the micro driving part 300 through a driving shaft 310, and the fiber fixing part 200 is horizontally moved at the time of rotation of the driving shaft 310.

4. The device of claim 3, wherein the micro driving part 300 is a piezo motor.

* * * * *